United States Patent [19]

Brack et al.

[11] 4,203,722
[45] May 20, 1980

[54] TRANSFER PRINTING PROCESS WITH NAPHTHOLACTAM DYES

[75] Inventors: Alfred Brack, Odenthal; Hans-Peter Kühlthau, Leverkusen, both of Fed. Rep. of Germany

[73] Assignee: Bayer Atkiengesellschaft, Leverkusen, Fed. Rep. of Germany

[21] Appl. No.: 952,560

[22] Filed: Oct. 18, 1978

[30] Foreign Application Priority Data

Oct. 20, 1977 [DE] Fed. Rep. of Germany ....... 2747110

[51] Int. Cl.$^2$ ........................... D06P 3/70; D06P 5/00
[52] U.S. Cl. ........................................ 8/467; 160/20; 160/22; 260/239.3 R
[58] Field of Search .......... 8/2.5 A, 168 AA, 168 CA

[56] References Cited

U.S. PATENT DOCUMENTS

| | | | |
|---|---|---|---|
| 3,399,191 | 8/1968 | Brack | 260/240.6 |
| 3,969,071 | 7/1976 | Hugelin | 8/2.5 |
| 3,999,939 | 12/1976 | Psaar | 8/2.5 A |
| 4,000,141 | 12/1976 | Kuhlthau | 8/1 D |
| 4,040,779 | 8/1977 | Loew et al. | 8/2.5 R |

FOREIGN PATENT DOCUMENTS 50-06884  1/1975  Japan.
50-40878  4/1975  Japan.
1323835  7/1973  United Kingdom.

OTHER PUBLICATIONS

Holland G. and Litherland, A., J. Soc. Dyers and Colourists, 1971, 87, (No.12), pp. 488-495.
Venkataraman, K, "The Chemistry of Synthetic Dyes,"-vol. VIII, (Academic Press), 1978, pp. 191-220.

Primary Examiner—A. Lionel Clingman
Attorney, Agent, or Firm—Sprung, Felfe, Horn, Lynch & Kramer

[57] ABSTRACT

Acid-modified fibre materials may be dyed in brilliant color shades in accordance with the transfer printing principle if dyestuffs of the formula

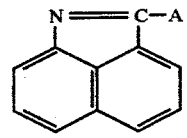

are used in which A is a residue of the formula

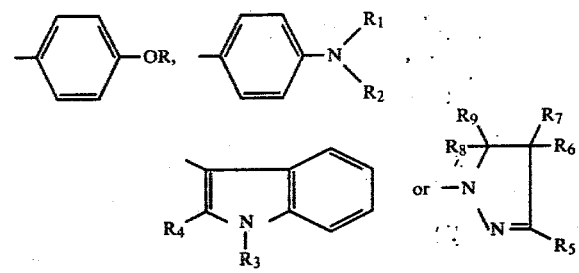

wherein $R_1$, $R_3$, $R_4$, $R_6$–$R_9$ are H or lower alkyl, R and $R_2$ are lower alkyl and $R_5$ is phenyl.

The resulting transfer prints are distinguished by good fastness to light, wet processing and rubbing.

10 Claims, No Drawings

TRANSFER PRINTING PROCESS WITH NAPHTHOLACTAM DYES

The invention relates to a process for printing, in accordance with the transfer printing principle, materials which consist completely or predominantly of polyacrylonitrile or acid-modified polyesters, characterised in that compounds of the formula

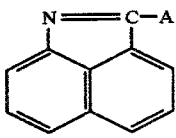

I wherein A represents a radical of the formula

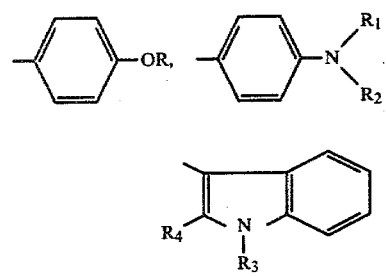

wherein
- R denotes a lower alkyl radical with at most 6 C atoms,
- $R_1$ denotes hydrogen or a lower alkyl radical with at most 6 C atoms,
- $R_2$ represents a lower alkyl radical with at most 4 C atoms,
- $R_3$ represents hydrogen or a lower alkyl radical with at most 4 C atoms,
- $R_4$ represents hydrogen or methyl,
- $R_5$ represents a phenyl radical which can be substituted by lower alkyl or alkoxy groups with at most 4 C atoms, or represents an α-thienyl radical and
- $R_6$, $R_7$, $R_8$ and $R_9$ represents hydrogen or a lower alkyl radical with at most 4 C atoms or a phenyl radical which is optionally substituted by non-ionic substituents, with the proviso that only one of the radicals $R_6$, $R_7$, $R_8$ and $R_9$ is an optionally substituted phenyl radical, and
- $R_1$ and $R_2$ can also be bonded to the phenylene radical in the position adjacent to the nitrogen, a tetrahydroquinoline ring or an indoline ring being formed, and wherein the cyclic and acyclic radicals can contain non-ionic substituents, are used as the dyestuffs, and to printing inks or printing pastes for transfer printing which contain dyestuffs of this type, temporary supports for transfer printing which are printed or impregnated with dyestuffs of this type, and textiles which have been dyed with dyestuffs of this type in accordance with the transfer printing principle.

Suitable non-ionic substituents within the scope of this invention are, above all, lower alkyl and alkoxy groups with at most 4 C atoms, preferably methyl, ethyl, methoxy and ethoxy groups, halogen atoms, preferably fluorine and chlorine, the nitrile group and lower alkylcarbonyl and alkoxycarbonyl groups with not more than 4 C atoms in the chain.

Dyestuffs of the formula I in which A represents a radical of the formula

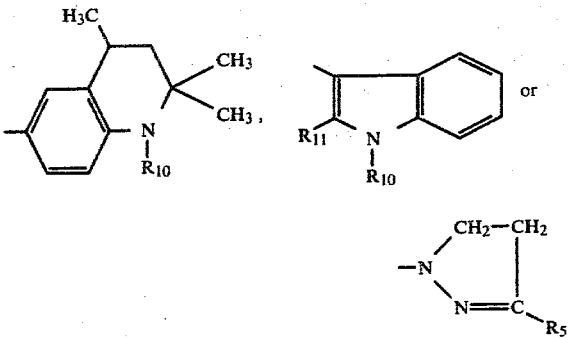

wherein
- $R_5$ has the meaning already indicated,
- $R_{10}$ represents hydrogen or a lower alkyl group with at most 6 C atoms and
- $R_{11}$ represents hydrogen or a methyl group, and wherein the benz-[c.d]-indole radical is unsubstituted or substituted by a chlorine atom are preferably used. Of these dyestuffs, those in which
- $R_{10}$ denotes hydrogen, methyl or ethyl,
- $R_{11}$ denotes hydrogen or methyl and
- $R_5$ denotes phenyl, 4-methoxyphenyl or 4-ethoxyphenyl, and in which the benz[c.d]-indole radical is unsubstituted, are particularly preferred.

The preparation of the dyestuffs is in itself known and is carried out by treating the hydrochlorides of the formula

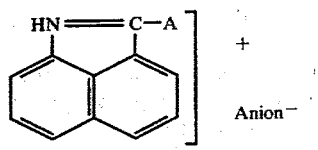

Ia obtainable from naphtho-1,8-lactam and the corresponding phenol ethers, amines, indole derivatives or pyrazoline derivatives by a condensation reaction in phosphorus oxychloride, with acid-binding agents, such as alkali metal hydroxide solution, sodium carbonate, milk of lime, ammonia and the like.

The transfer printing process to be used according to the invention is generally known and has been described, for example, in French Patent Specifications Nos. 1,223,330 and 1,334,829. The dyestuffs are applied, for example in the form of so-called printing inks, such as are described, for example, in French Patent Specification No. 1,573,698, or as pastes, to so-called temporary supports (paper, other cellulose materials, such as cotton or Cellophane, metal foils and the like, such as are known, for example, from French Patent Specification No. 1,575,069). These printing inks are solutions of the dyestuffs in suitable organic solvents, such as benzene, toluene, xylene, chlorobenzene, chloroform, dichloroethane, trichloroethane, perchloroethylene, ethanol, i-propanol, benzyl alcohol, cyclohexanone, ethyl acetate and mixtures thereof, which contain synthetic resins. However, the printing inks and printing pastes can also be built up on an aqueous basis and are thus dispersions of the dyestuffs in water, which additionally contains customary dispersing agents and thickeners (compare French Pat. No. 1,223,330).

The process according to the invention gives brilliant, very fast transfer prints, with a particularly high colour yield. The transfer prints on polyacrylonitrile, in particular, are distinguished by good fastness to light, wet processing and rubbing.

EXAMPLE 1

7 g of the dyestuff of the formula

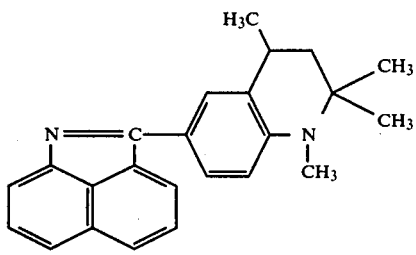

are dissolved, with the addition of 2 g of sodium methylate, in an amount of a mixture of 10 g of ethylglycol, 86 g of ethyl alcohol and 4 g of ethylcellulose such that the volume of the finished ink is 100 ml. If a paper impregnated with this ink is pressed together with a textile consisting of polyacrylonitrile for 30-60 seconds at about 200° C., a very deep, brilliant, reddish-tinged blue print with very good fastness to light, wet processing and rubbing is obtained.

If instead of this dyestuff the same amount of the corresponding N-ethyl, N-n-propyl, N-n-butyl or N-hydrogen compound is used, fast, reddish-tinged blue prints are likewise obtained.

The addition of sodium methylate to the printing ink can also be dispensed with.

The dyestuffs are obtainable by condensation of naphtholactam with the corresponding tetrahydroquinoline derivatives; the preparative details correspond to the statements of U.S. Pat. No. 4,000,141.

EXAMPLE 2

20 g of the dyestuff of the formula

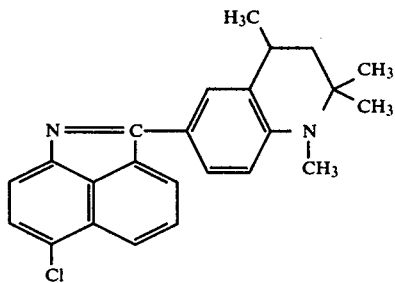

are ground in a bead mill together with 5 g of a cyclohexanone/formaldehyde resin which has a softening point of over 160° C., and with 5 g of ethylcellulose N₄. 100 g of printing ink are prepared by adding toluene which contains about 10% of polywaxes. A paper printed with this ink is pressed together with a polyacrylonitrile textile at about 200° C. for about 2 minutes. A blue print of high brilliance which is very fast to light is obtained.

EXAMPLE 3

7 g of the dyestuff of the formula

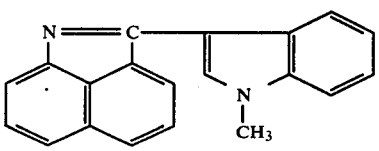

are processed according to the statements in Example 1. A very fast, orange-red transfer print is obtained.

If the same amount of the corresponding N-ethyl, N-n-propyl, N-i-propyl or N-n-butyl derivative is used, similar prints are obtained.

If the same amount of one of the dyestuffs of the formula

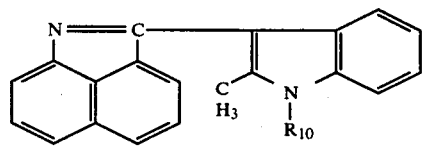

$R_{10}$ = methyl or ethyl, is used, a very fast, somewhat bluish-tinged red transfer print is obtained.

The dyestuffs are prepared according to the statements of German Patent Specifications Nos. 1,259,485 and 1,184,882.

EXAMPLE 4

5 g of the dyestuff of the formula

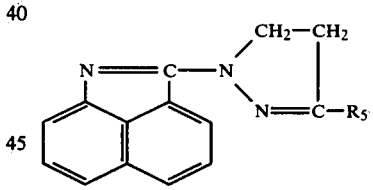

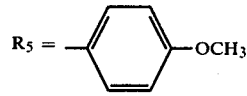

are processed according to the statements in Example 1. A very fast, yellow transfer print of high brilliance is obtained.

A similar transfer print is obtained if the same amount of one of the dyestuffs in which $R_5$=p-ethoxyphenyl or α-thienyl is employed.

If the dyestuff in which $R_5$=phenyl is used, a greenish-tinged yellow transfer print is obtained.

The dyestuffs are prepared according to the statements of British Patent Specification No. 1,323,835, in particular Example 2.

We claim:

1. Process for dyeing, by transfer printing, materials made of polyacrylonitrile or acid-modified polyesters, characterised in that dyestuffs of the formula

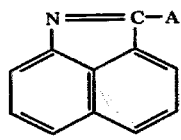

wherein

A represents a radical of the formula

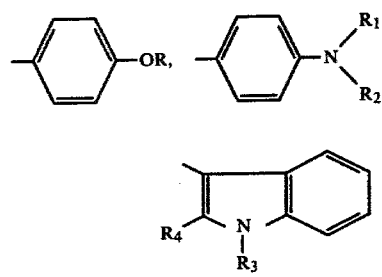

or

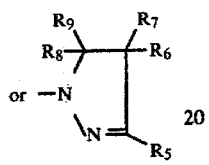

wherein
- R denotes a lower alkyl radical with at most 6 C atoms,
- $R_1$ denotes hydrogen or a lower alkyl radical with at most 6 C atoms,
- $R_2$ represents a lower alkyl radical with at most 4 C atoms,
- $R_3$ represents hydrogen or a lower alkyl radical with at most 4 C atoms,
- $R_4$ represents hydrogen or methyl,
- $R_5$ represents a phenyl radical which can be substituted by lower alkyl or alkoxy groups with at most 4 C atoms, or represents an α-thienyl radical and
- $R_6$, $R_7$, $R_8$ and $R_9$ represent hydrogen or a lower alkyl radical with at most 4 C atoms or a phenyl radical, with the proviso that only one of the radicals $R_6$, $R_7$, $R_8$ and $R_9$ is an optionally substituted phenyl radical, and wherein
the radical $R_1$ or $R_2$ can also be bonded to the phenyl radical in the position adjacent to the nitrogen, a tetrahydroquinoline ring or an indoline ring being formed,
and wherein the cyclic and acyclic radicals can contain non-ionic substituents, are used.

2. Process according to claim 1, characterized in that dyestuffs of the formula indicated in claim 1, in which
A represents a radical of the formula

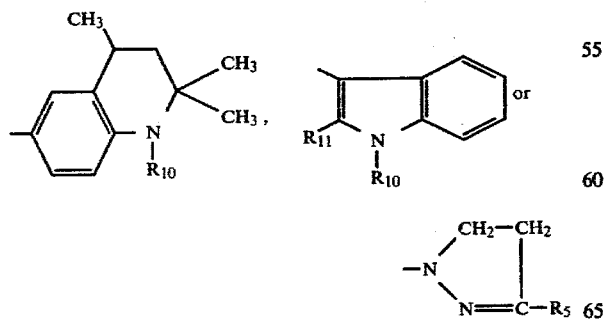

wherein
$R_5$ has the meaning already indicated, $R_{10}$ represents hydrogen or a lower alkyl group with at most 6 C atoms and
$R_{11}$ represents hydrogen or a methyl group,
and wherein the benz[c.d]-indole radical is unsubstituted or substituted by a chlorine atom are used.

3. Process according to claim 1, characterised in that dyestuffs of the formula indicated in claim 1, in which
A represents a radical of the formula

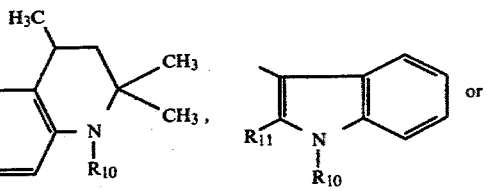

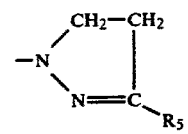

wherein
- $R_5$ denotes phenyl or 4-methoxyphenyl,
- $R_{10}$ denotes hydrogen, methyl or ethyl and
- $R_{11}$ denotes hydrogen or methyl, and wherein the benz[c.d]-indole radical is unsubstituted, are used.

4. Process according to claim 1, characterised in that the dyestuff of the formula

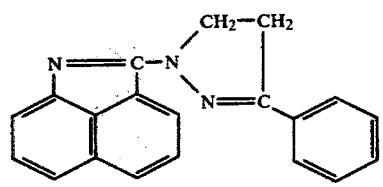

is used.

5. Process according to claim 1, characterised in that the dyestuff of the formula

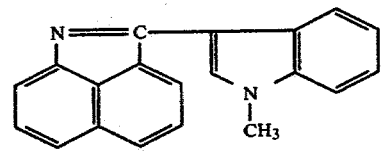

is used.

6. Process according to claim 1, characterised in that the dyestuff of the formula

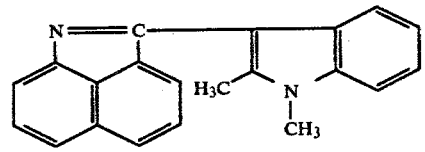

is used.

7. Process according to claim 1, characterised in that the dyestuff of the formula

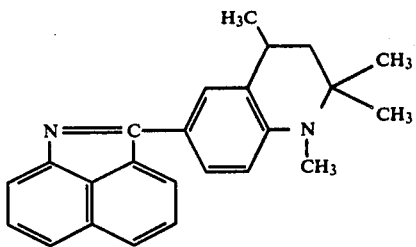
is used.
8. Process according to claim 1, characterised in that the dyestuff of the formula
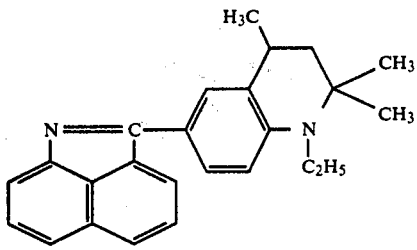
is used.
9. Temporary supports for transfer printing, characterised in that they are printed or impregnated with the dyestuffs of any one of claims 1–8.
10. Printing inks and printing pastes for transfer printing, characterised in that they contain the dyestuffs of any one of claims 1–8.
* * * * *